(12) United States Patent
Janssen et al.

(10) Patent No.: US 11,213,035 B2
(45) Date of Patent: Jan. 4, 2022

(54) SEPARATING DEVICE FOR SEPARATING A FIRST AND A SECOND BONE OR CARTILAGE PARTS FROM EACH OTHER

(71) Applicant: MAREL MEAT B.V., Boxmeer (NL)

(72) Inventors: Cornelis Joannes Janssen, Holthees (NL); Jan Meerdink, Ravenstein (NL)

(73) Assignee: MAREL MEAT B.V., Boxmeer (NL)

( * ) Notice: Subject to any disclaimer, the term of this patent is extended or adjusted under 35 U.S.C. 154(b) by 0 days.

(21) Appl. No.: 16/963,915

(22) PCT Filed: Jan. 30, 2019

(86) PCT No.: PCT/EP2019/052237
§ 371 (c)(1),
(2) Date: Jul. 22, 2020

(87) PCT Pub. No.: WO2019/149746
PCT Pub. Date: Aug. 8, 2019

(65) Prior Publication Data
US 2021/0037835 A1    Feb. 11, 2021

(30) Foreign Application Priority Data

Jan. 30, 2018 (EP) .................................... 18154172

(51) Int. Cl.
*A22B 5/00* (2006.01)
(52) U.S. Cl.
CPC .................................. *A22B 5/0029* (2013.01)
(58) Field of Classification Search
CPC ................................ A22B 5/00; A22B 5/0029
(Continued)

(56) References Cited

U.S. PATENT DOCUMENTS 4,006,514 A * 2/1977 Penman ............... A22C 25/006
452/137
5,180,329 A * 1/1993 Meyer .................. A22B 5/0058
30/241

(Continued)

FOREIGN PATENT DOCUMENTS

BE    1010518 A7    10/1998
DE    2403929 A1    8/1975

OTHER PUBLICATIONS

International Search Report and Written Opinion from PCT Application No. PCT/EP2019/052237, Apr. 11, 2019.

(Continued)

*Primary Examiner* — Richard T Price, Jr.
(74) *Attorney, Agent, or Firm* — Workman Nydegger

(57) ABSTRACT

A separating device for separating first and second bones or cartilage parts comprises a first structure with a first elongated member and a stationary engaging member at one end of the first elongated member; a second structure with a second elongated member and a separation member at one end of the second elongated member; a moving device for moving the second structure relative to the stationary engaging member from a contracted position to a closed position. An angular position of the first and the second structures are adjusted, so the subsequent movement of the separation member towards the closing position intersects a separation area between the first and second bones or cartilage parts causing an immediate separation between the first and second bones or cartilage parts.

20 Claims, 4 Drawing Sheets

(58) Field of Classification Search
USPC .................. 452/149–152, 160, 166, 167
See application file for complete search history.

(56) References Cited

U.S. PATENT DOCUMENTS

| | | | | |
|---|---|---|---|---|
| 5,368,520 | A * | 11/1994 | Koch | A22C 21/0023 |
| | | | | 452/136 |
| 6,354,933 | B1 * | 3/2002 | Archambault | A22B 5/0035 |
| | | | | 452/135 |
| 8,257,154 | B2 * | 9/2012 | Seaton | A22B 5/0035 |
| | | | | 452/149 |
| 2004/0142651 | A1 | 7/2004 | Jensen et al. | |
| 2014/0142651 | A1 * | 5/2014 | Rouw | A61N 1/3622 |
| | | | | 607/18 |
| 2015/0056902 | A1 * | 2/2015 | Bender | A22C 11/10 |
| | | | | 452/46 |

OTHER PUBLICATIONS

Search Report from corresponding EP Application No. EP18154172. 3, Jul. 9, 2018.

* cited by examiner

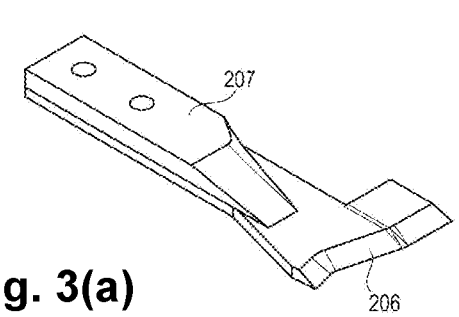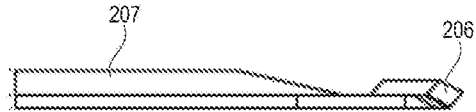
Fig. 3(a)　　　　　　　　　Fig. 3(b)
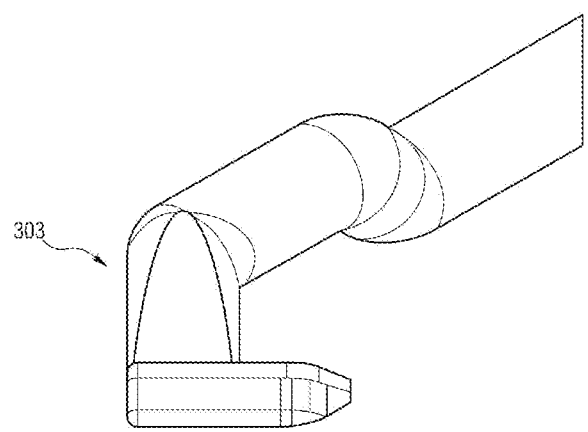
Fig. 4

SEPARATING DEVICE FOR SEPARATING A FIRST AND A SECOND BONE OR CARTILAGE PARTS FROM EACH OTHER

FIELD OF THE INVENTION

The present invention relates to a separating device for separating a first and a second bone or cartilage parts from each other.

BACKGROUND OF THE INVENTION

Deboning an animal carcass is a very labor intensive process, especially when separating bone or cartilage parts from each other. One of many examples is when separating hip bone from a tail bone on ham. This is typically done by sticking a very massive knife in the area between the hip bone and the tail bone and then break the connection by massive force and rotation of the knife. If this action needs to be done repetitively it will eventually cause problems to the operator's wrist shoulder and/or elbow and is thus ergonomically unacceptable.

Also, while sticking in the massive knife mostly lumps of meat stay on the tail bone, so a negative influence on the meat performance meaning the risk of meat loss is quite high due to poor performance.

SUMMARY OF THE INVENTION

On the above background it is an object of embodiments of the present invention to provide a separating device to be used when deboning animal carcasses where the separating device allows automatic or semi-automatic way of separating a first and a second bone or cartilage parts from each other.

In general, the invention preferably seeks to mitigate, alleviate or eliminate one or more of the above mentioned disadvantages of the prior art singly or in any combination. In particular, it may be seen as an object of embodiments of the present invention to provide a separating device that solves the above mentioned problems, or other problems.

To better address one or more of these concerns, in a first aspect of the invention a separating device is provided for separating a first and a second animal bone or cartilage parts from each other, comprising:
a first structure comprising a first elongated member and a stationary engaging member at the end of the first elongated member,
a second structure comprising a second elongated member and a separation member at the end of the second elongated member,
a moving device for moving the second structure relative to the stationary engaging member from a contracted position, where the separation member is in a contracted position in relation to the stationary engaging member, to a closed position, where the separation member and the stationary engaging member converge,
where during use the stationary engaging member is placed in a propped position behind the connection between a first and a second bone or cartilage parts while the separation member is in the contracted position, and where the angular position of the first and the second structures is adjusted such that the subsequent movement of the separation member towards the closed position intersects a separation area between the first and the second bone or cartilage parts causing an immediate separation between the first and the second bone or cartilage parts.

Accordingly, a device is provided that improves the ergonomics for an operator during deboning of animal carcasses, where instead of manually using e.g. a knife to separate e.g. two bone or cartilage parts from each other, the separating device may be used as a tool in performing the separation.

In one embodiment, the second structure is slideable attached to the first structure via an adapter block that allows the second structure to move in a back and forth movement along the first elongated member. Accordingly, it is ensured that the relative distance between the first and second structures is always the same and the accuracy and the yield is improved.

The moving device may according to the invention comprise any kind of a motor device, air cylinder, hydraulic cylinder or the like.

In one embodiment, the stationary engaging member comprises a hook-like structure. The term hook-like structure should preferably be construed as a structure that facilitates e.g. an operator to initially move the first structure to an initial position such that it is propped in said initial position. Such a structure can e.g. include a V-shaped structure, a U-shaped structure, a J-shaped structure etc.

In one embodiment, the separation member comprises a chisel-like structure. The chisel-like structure in one embodiment comprises a flat blade structure having a sharp front side and along the flat blade and partly upwardly extending structure, where the sharp front side ensures a clean cut between the first and the second bone or cartilage parts, followed by a separation there-between via the upwardly extending structure.

In one embodiment, the separating device further comprises a first and a second levers (handles or grips) for an operator for allowing an operator to place the stationary engaging member in said propped position behind the second bone or cartilage. Said first and second levers may in one embodiment comprise an activation/de-activation mechanism for activating/de-activating movement of said moving device.

In an embodiment, the separating device further comprises a balancer device for at least partly carrying the separating device while simultaneously allowing an operator to manipulate the separating device.

Accordingly, the separating device may be used as a hand held or semi hand held device where an operator may accurately position the stationary engaging member in said initial position behind the second bone or cartilage part while simultaneously maintaining ergonomic conditions for the operator.

Said first and a second bone or cartilage parts may as an example be separating a hip bone from the tail bone during ham deboning. This should however not be construed as being limiting to ham deboning and to separating or breaking the connection between the hip bone from the tail bone. The separating device may be suitable for all kinds of deboning of all kinds of animal carcasses.

Referring to this example, when separating a hip bone from the tail bone an operator holds the first and the second levers and in that way manipulates the separating device by positioning the engaging member, e.g. said hook, behind the connection of the tail and hipbone where the engaging member remains stationary. The separation member, e.g. said chisel, is placed on top of the wing of ilium. Subsequently, the operator activates the moving device by e.g. pressing both levers at the same time, for safety reasons. The moving device, e.g. said air piston, then moves outwards, hereby guiding the chisel over the wing of ilium ensuring the splitting of the tail and the hipbone, at or near to the cartilage connection between tail and aitchbone, and cracking the last bone connection as the chisel reaches the position completely extended. The operator may then loosen one or preferably both levers so the device returns to starting position and can be removed from the ham.

In one embodiment, the separating device is attached to a robotic device. The robotic device may as an example comprise a vision system to for accurately and automatically positioning the stationary engaging member in said initial position behind the second bone and to automatically remove the connection between the bones and thus separate the first and the second bone or cartilage parts from each other.

In a second aspect of the invention a method is provided for separating a first and a second animal bone or cartilage part from each other using a separating device, where the separating device comprises:
a first structure comprising a first elongated member and a stationary engaging member at the end of the first elongated member,
a second structure comprising a second elongated member and a separation member at the end of the second elongated member,
a moving device for moving the second structure relative to the stationary engaging member from a contracted position, where the separation member is in a contracted position in relation to the stationary engaging member, to a closed position, where the separation member and the stationary engaging member converge,
wherein the method comprises:
placing the engaging member in a propped position behind the connection between the first and a second bone or cartilage parts while the separation member is in a contracted position,
adjusting the angular position of the first and the second structures such that the subsequent movement of the separation member towards the closed position intersects a separation area between the first and the second bone or cartilage parts causing an immediate separation between the first and the second bone or cartilage parts.

One of many examples is when separating hip bone from a tail bone on ham. This is typically done by sticking a very massive knife in the area between the hip bone and the tail bone and then break the connection by massive force and rotation of the knife. If this action needs to be done repetitively it will eventually cause problems to the operators wrist shoulder and/or elbow and is thus ergonomically unacceptable.

Also, while sticking in the massive knife mostly lumps of meat stay on the tail bone, so a negative influence on the meat yield meaning the risk of meat loss is quite high due to poor performance of the operator that carries out the process. Using a separating device according to the embodiments of the invention will alleviate or eliminate these problems and increase the yield.

BRIEF DESCRIPTION OF THE DRAWINGS

Embodiments of the invention will be described, by way of example only, with reference to the drawings, in which FIGS. 1 *a-b* and 2 *a-b* depict a separating device according to the present invention for separating a first and a second bone or cartilage parts from each other, FIGS. 3 *a-b* shows a more detailed view of one embodiment of a separation member used in relation to the separating device according to the present invention, FIG. 4 shows a more detailed view of one embodiment of a stationary engaging member used in relation to the separating device according to the present invention.

DESCRIPTION OF EMBODIMENTS

Figure 5:
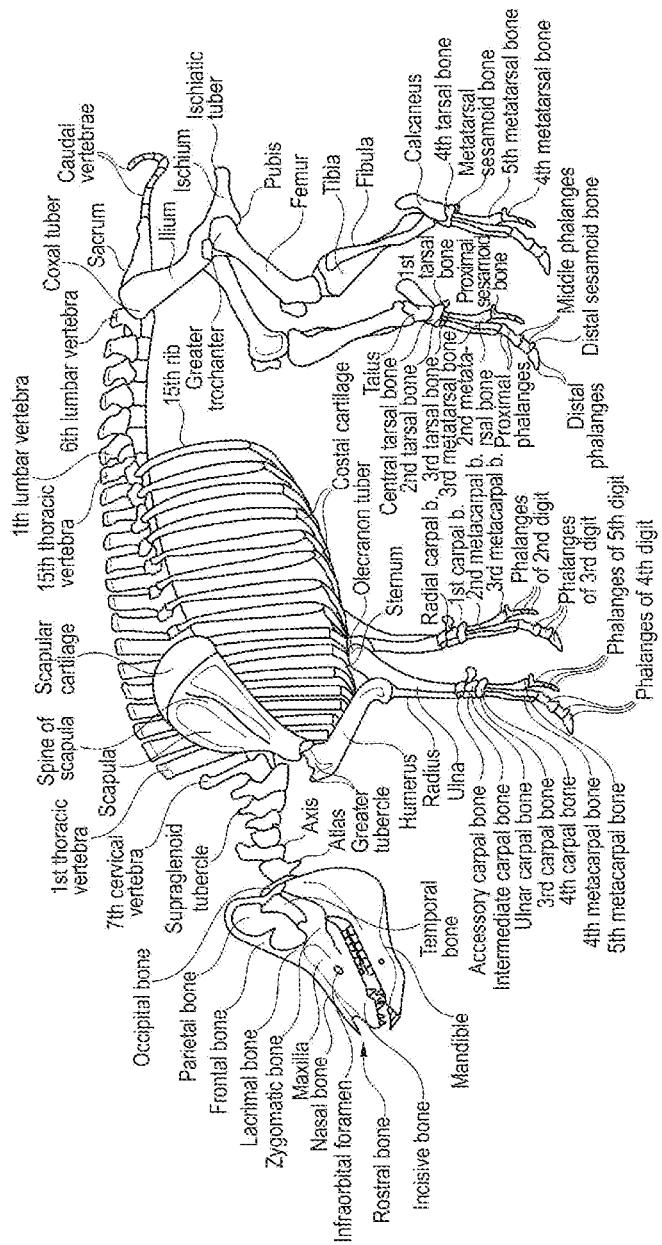
FIGS. 5 and 6 show anatomic structure of a pig.
Figure 6:
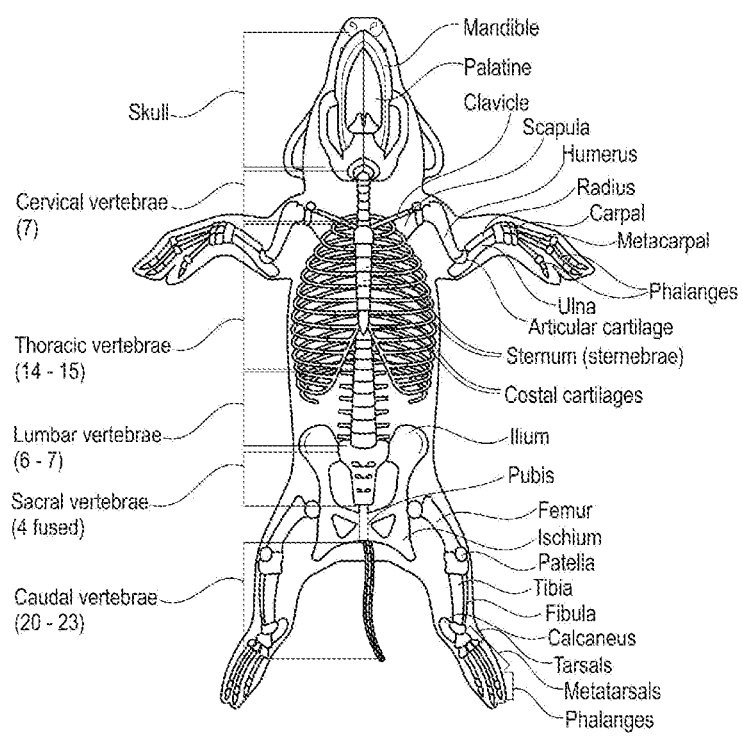

FIGS. 1 *a-b* and 2 *a-b* depict a separating device 100 according to the present invention for separating a first and a second bone or cartilage parts from each other. It should be noted that with the term first and second bone or cartilage parts may be understood as e.g. all connections between bone/cartilages shown in FIGS. 4 and 5. This should of course not be construed as being limited to pork only, the separating device may just as well be used during deboning other animals such as beef carcasses, sheep carcasses etc.

The separating device a first structure 101 comprises a first elongated member 102 and a stationary engaging member 103 at the end of the first elongated member 101, a second structure 104 comprising a second elongated member 105 and a separation member 106 at the end of the second elongated member 104. In the embodiment shown here, the stationary engaging member comprises a hook-like structure and the separation member comprises a chisel-like structure comprising a sharp blade 106 and along the flat blade an upwardly extending structure 107.

Figures 1A, 1B:
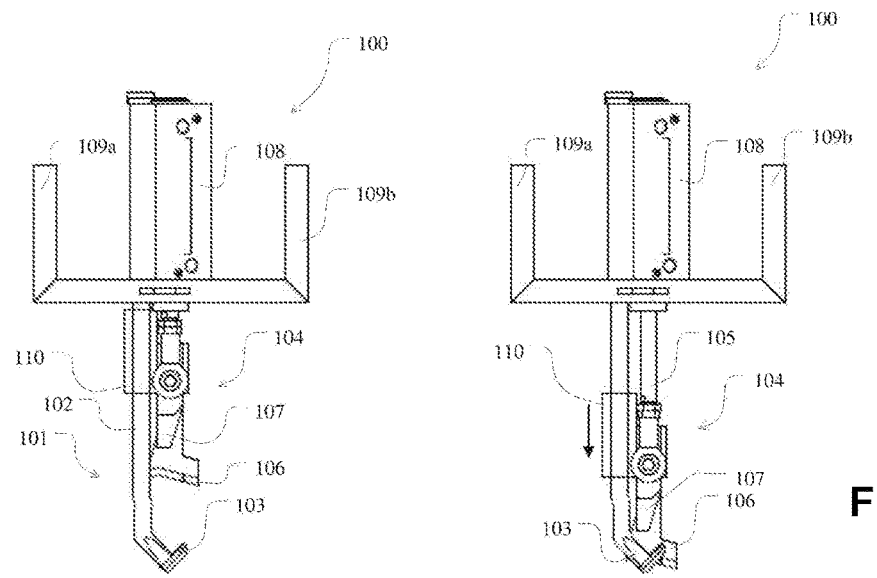
Figures 2A, 2B:
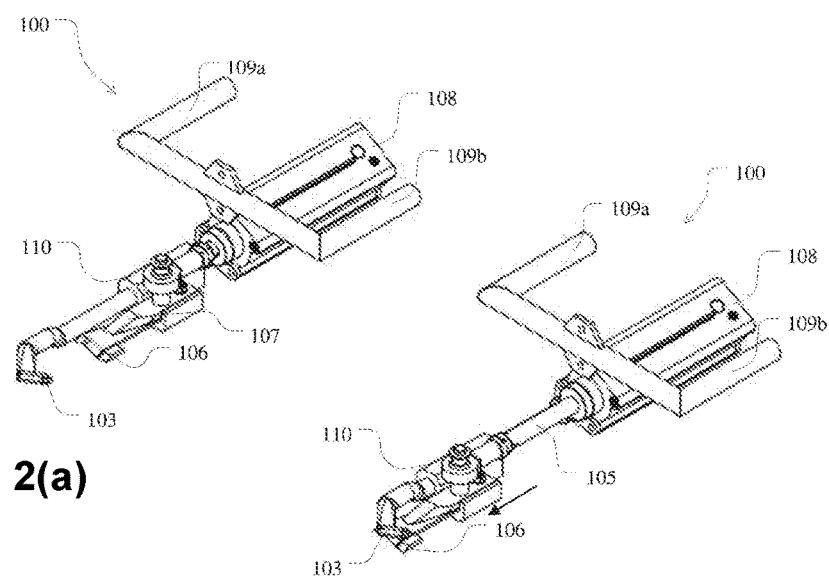

The separating device 100 further comprises a moving device 108 or a motor, e.g. air cylinder, for moving the second structure 104 relative to the stationary engaging member 103 and the first elongated member 102 from a contracted position shown in FIGS. 1*a* and 2*a*, where the separation member 106, 107 is in a contracted position in relation to the stationary engaging member 103, to a closed position shown in FIGS. 1*b* and 2*b*, where the separation member and the stationary engaging member converge, i.e. are adjacent each other. To facilitate this back and forth movement, an adaptor block 110 is provided, to which the second structure 104 is attached, where the adaptor block 110 is slideable attached to the first structure and allows the second structure to move in a back and forth movement as indicated by the arrow parallel and along the first elongated member 102.

The separating device 100 further comprises a first and second levers 109*a*, 109*b* acting as a manipulation rod for allowing an operator to use both hands/arms to operate the device. In a preferred embodiment, the first and second levers comprise an activation/de-activation mechanism for activating/de-activating said moving device 108. Due to the weight of the separating device 100, it may be attached to a balancer device for at least partly carrying the separating device while simultaneously allowing an operator to manipulate the separating device in x-y-z direction and preferably also rotating the separating device during use.

FIGS. 1*a* and 2*a* show the separating device 100 in said contracted position. In this position, the operator uses the manipulation rods to position the stationary engaging member 103, in this case the hook 103, behind the connection of the first and the second bone or cartilage parts (not shown), thus with the bones or cartilage parts located between the stationary engaging member and the separation member. As an example, in case of deboning ham, this may involve placing the hook 103 behind tail- and hipbone. At this movement, the operator makes suitable adjustments, e.g. angular adjustments of the device such that the subsequent movement of the separation member via said activation/de-activation mechanism. FIGS. 1*b* and 2*b* show where the second structure 104 moves towards the closed position and intersects a separation area between the first and the second bone or cartilage parts causing an immediate separation between the first and the second bone or cartilage parts. Referring to said example, the blade 106 is guided over the "flap" of the aitchbone ensuring the splitting of the tail and the hipbone, at or near to the cartilage connection between tail and aitchbone, and cracks the last bone connection as the chisel reaches the position completely extended. A subsequent step would typically be to loosen one or preferably both levers so the device returns to starting position.

FIGS. 3*a* and 3*b* show a more detailed view of one embodiment of a separation member, which as shown here comprises a chisel like structure comprising a sharp blade 206 and along the flat blade an upwardly extending structure 207. The design should not be construed of being limited to what is shown here, e.g. the height ratio between the blade 206 and the structure 207 may of course be different, as well as the front side of the blade 206.

FIG. 4 shows one embodiment of a stationary engaging member 303, but any shapes may of course be applied and designed such that it is ensured that the engaging member may be placed in a propped position.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A separating device for separating first and second bones, or first and second cartilage parts from each other, comprising:
    a first structure comprising a first elongated member and a stationary engaging member at one end of the first elongated member;
    a second structure comprising a second elongated member and a separation member at one end of the second elongated member;
    a moving device for moving the second structure relative to the stationary engaging member from a contracted position, where the separation member is in a contracted position in relation to the stationary engaging member, to a closed position, where the separation member and the stationary engaging member converge;
    wherein during use, the stationary engaging member is placed in an initial position behind a connection between the first and second bones, or the first and second cartilage parts, with the first bone or second bone, or the first cartilage part or the second cartilage part located between the stationary engaging member and the separation member, while the separation member is in a contracted position; and
    wherein an angular position of the first and the second structures are adjusted such that the subsequent movement of the separation member towards the closed position intersects a separation area between the first and second bones or the first and second cartilage parts causing an immediate separation between the first and second bones or the first and second cartilage parts.

2. The separating device according to claim 1, wherein the second structure is slidably attached to the first structure via an adapter block that allows the second structure to move in a back and forth movement parallel to and along with the first elongated member.

3. The separating device according to claim 1, wherein the stationary engaging member comprises a hook-like structure.

4. The separating device according to claim 1, wherein the separation member comprises a chisel-like structure.

5. The separating device according to claim 1, wherein the moving device comprises an air cylinder.

6. The separating device according to claim 1, further comprising first and second levers for an operator arranged to place the stationary engaging member in said initial position behind the second bone or at least one of the first or second cartilage parts.

7. The separating device according to claim 1, wherein said first and second levers comprise an activation/deactivation mechanism for activating/de-activating movement of said moving device.

8. The separating device according to claim 1, further comprising a balancer device for at least partly carrying the separating device and arranged to manipulate the separating device simultaneously.

9. The separating device according to claim 1, wherein the separating device is a handheld or semi handheld device.

10. The separating device according to claim 1, wherein the separating device is attached to a robotic device.

11. A method of separating first and second bones, or first or second cartilage parts from each other using a separating device, where the separating device comprises:
    a first structure comprising a first elongated member and a stationary engaging member at one end of the first elongated member;
    a second structure comprising a second elongated member and a separation member at one end of the second elongated member;
    a moving device for moving the second structure relative to the stationary engaging member from a contracted position, where the separation member is in a contracted position in relation to the stationary engaging member, to a closed position, where the separation member and the stationary engaging member converge;
    wherein the method comprises:
    placing the engaging member in an initial position behind a connection between the first and second bones or the first and second cartilage parts while the separation member is in a contracted position, with the first and second bones or the first and second cartilage parts located between the stationary engaging member and the separation member;
    adjusting an angular position of the first and second structures such that the subsequent movement of the separation member towards the closed position intersects a separation area between the first and second bones or the first and second cartilage parts causing an immediate separation between the first and second bones or the first and second cartilage parts.

12. A separating device for separating first and second bones, or first and second cartilage parts from each other, comprising:
    a first structure comprising a first elongated member and a stationary engaging member at one end of the first elongated member;

a second structure comprising a second elongated member and a separation member at one end of the second elongated member;

a moving device for moving the second structure relative to the stationary engaging member from a contracted position, where the separation member is in a contracted position in relation to the stationary engaging member, to a closed position, where the separation member and the stationary engaging member converge;

a balancer device for at least partly carrying the separating device while simultaneously allowing an operator to manipulate the separating device;

wherein during use the stationary engaging member is placed in an initial position behind a connection between the first and second bones, or the first and second cartilage parts, with the first bone or second bone, or the first cartilage part or the second cartilage part located between the stationary engaging member and the separation member, while the separation member is in a contracted position;

wherein an angular position of the first and the second structures is adjusted such that the subsequent movement of the separation member towards the closed position intersects a separation area between the first and second bones or the first and second cartilage parts causing an immediate separation between the first and second bones or the first and second cartilage parts;

wherein the second structure is slideable attached to the first structure via an adapter block that allows the second structure to move in a back and forth movement parallel to and along with the first elongated member.

13. The separating device according to claim 12, wherein the stationary engaging member comprises a hook-like structure.

14. The separating device according to claim 12, wherein the separation member comprises a chisel-like structure.

15. The separating device according to claim 12, wherein the moving device comprises an air cylinder.

16. The separating device according to claim 12, further comprising first and second levers for an operator for allowing an operator to place the stationary engaging member in said initial position behind the second bone or at least one of said first and second cartilage parts.

17. The separating device according to claim 16, wherein said first and second levers comprise an activation/deactivation mechanism for activating/de-activating movement of said moving device.

18. The separating device according to claim 12, further comprising a balancer device for at least partly carrying the separating device and arranged to manipulate the separating device simultaneously.

19. The separating device according to claim 12, wherein the separating device is a handheld or semi handheld device.

20. The separating device according to claim 12, wherein the separating device is attached to a robotic device.

* * * * *